United States Patent Office 2,719,811
Patented Oct. 4, 1955

2,719,811
MEANS FOR CONTROLLING THE RESPIRATION OF ANIMAL CELLS

Elton S. Cook and Cornelius W. Kreke, Cincinnati, Ohio, assignors to Institutum Divi Thomae Foundation, Cincinnati, Ohio, a corporation of Ohio No Drawing. Application October 1, 1945,
Serial No. 619,694

6 Claims. (Cl. 167—58)

Our invention has to do with means for stimulating life processes in animal cells and tissues, and in particular with means for accelerating the oxygen uptake of such cells.

It is known, for example, that human skin respires, taking up oxygen from the surrounding atmosphere and from the bloodstream as a function of the cell life in the skin tissue. One difference between old skin and young skin is that the rate of respiration declines with age, young skin respiring or breathing more rapidly than old skin and absorbing greater quantities of oxygen. Skin which has been exposed to agents or influences such as light, wind, massage and the like, shows stimulation of respiration.

George Sperti in U. S. Patents Nos. 2,320,478, 2,320,479 and 2,239,345 taught the preparation of an agent which promoted the respiration of animal cells. This is a material, organic in origin and complex in its nature, derived by extraction processes taught in those patents from yeast or from certain animal tissues such as beef spleens. It was found that such water-soluble, substantially protein-free extractives, purified as may be required, acted to produce a marked stimulation of cellular respiration.

It was also established in connection with the work leading to those patents that manometric measurements of the respiration of rat skin cells under varying conditions is an index of the effect of the same conditions upon human skin cells.

Sperti taught the addition of his extractives to topical remedies, to cosmetics, and to detergents for the general stimulation of cellular respiration as well as for the off-setting of the respiration-depressing tendencies of substances normally found in such remedies, detergents and cosmetics. Cosmetics and detergents, although they may possess other beneficial properties, act, or contain ingredients which act, to depress the respiration of animal cells.

Again, a usual treatment of burns was characterized by such measures as the exclusion of external air, which prevents the normal respiration of epithelial tissue by absorption of oxygen from the air, and by the use (to prevent infection) of germicidal agents and astringents which depress respiration. Thus healing was retarded; and the burn healed slowly with the formation of scar tissue rather than normal skin. Depression of respiration of tissue was characteristic of topical remedies, particularly those containing antiseptics or germicides, whereas, it is obviously desirable that proliferation and healing proceed under conditions of normal metabolism.

Yet again, in remedies intended for the promotion of wound healing, it is desirable to stimulate the cellular proliferation or growth of the injured tissue, whereas many then current treatments had an opposite effect.

Sperti found that he could overcome these difficulties by the use of his extractives in remedies, detergents and cosmetics, to the extent of diminishing or offsetting the depression of respiration produced by other ingredients or even to the extent of increasing cellular respiration beyond the value obtainable in the absence of such other ingredients.

A fundamental object of this invention is the provision of substances which have enhanced properties of respiratory stimulation and may be used either alone or in combination with the Sperti material or in combinations with each other for purposes set forth in the said patents and for other purposes as will hereinafter appear. Other objects have to do with the securing of various advantages of the new uses of our substances and of materials compounded with them.

These and other objects of our invention which will be set forth hereinafter or will be apparent to one skilled in the art upon reading these specifications, we accomplish in those compositions and by those uses of substances of which we shall describe certain exemplary embodiments.

Our invention is based upon our discovery of the activity of certain metal complexes, in the field of this invention. These metal complexes have been found to be powerful stimulants of metabolism in animal cells. They have been found specifically to enhance cellular respiration in a high degree. They have been found to affect certain types of enzymatic activity in animal cells. They have been found to offset certain types of toxicities which would otherwise deleteriously affect both the respiration and other activities of the cell.

Our substances do not function as a substrate or simple food material for the cells but, on the other hand, are believed to accomplish their result in principal part at least by a direct acceleration of the enzymatic processes of the cell.

The metals involved are magnesium, calcium, potassium, iron, zinc, manganese, and lithium, and in some instances copper. Other metals may also serve; but experiments have shown that cobalt is ineffective and that certain organic salts of copper and magnesium tend to depress respiration. The metals employed are ones which can be identified as components of the structure of animal cells and tissues. The complexes, with an exception hereafter to be noted, are preferably metallic salts of hydroxy acids of the general class of citrates, tartrates and cis aconitates.

With the exception referred to above, metallic salts of ordinary inorganic acids will not serve, which we believe means that simple metallic ions are not active for our purpose. On the other hand, the organic hydroxy acids themselves are not active for our purpose.

The effect of our substances in increasing cellular respiration can readily be determined by manometric methods. Respiratory measurements are made at 37.5° C. in Ringer phosphate-glucose solution at a pH of 7.3, containing 0.02% glucose, with Warburg respirometers. In the results hereinafter set forth the tissues employed were the skin tissues of 5 months old pure strain rats. After an equilibrium period of 15 minutes in which the solutions are allowed to come to temperature, the respirometers are closed to air and allowed to run for 2 hours, during which time the oxygen uptake of control tissue and tissue respiring in the presence of our compounds is measured.

The table below shows the percentage of stimulation obtained with different amounts of our metal complexes on rat skin tissue.

| Compound | Concentration of metal complex in milligrams per millilitre | Percentage Stimulation |
|---|---|---|
| Calcium cis-Aconitate | 5.0 | 140 |
| | 3.0 | 108 |
| | 1.0 | 86 |
| | 0.1 | 15 |
| | 0.01 | 13 |

| Compound | Concentration of metal complex in milligrams per millilitre | Percentage Stimulation |
|---|---|---|
| Magnesium Citrate | 5.0 | 149 |
| | 3.0 | 67 |
| | 2.0 | -- |
| | 1.0 | 45 |
| | 0.5 | 45 |
| | 0.1 | 20 |
| Magnesium cis-Aconitate | 5.0 | 111 |
| | 3.0 | 88 |
| | 1.0 | 40 |
| | 0.5 | 19 |
| | 0.1 | 19 |
| Calcium Citrate | 5.0 | 83 |
| | 3.0 | 72 |
| | 1.0 | 35 |
| | 0.1 | 33 |
| | 0.01 | 17 |
| Magnesium Citrate | 5.0 | 65 |
| | 3.0 | 19 |
| | 2.0 | -- |
| | 1.0 | -- |
| | 0.5 | -- |
| Ferric Tartrate | 1.0 | 37 |
| | 0.3 | 12 |
| | 0.1 | 25 |
| | 0.05 | -- |
| Ferric Citrate | 5.0 | -- |
| | 3.0 | 15 |
| | 1.0 | 24 |
| | 0.5 | 15 |
| | 0.1 | 27 |
| | 0.01 | -- |
| | 0.005 | -- |

It can be shown by manometric measurements run with the metal complexes alone that the absorption of oxygen is not due to oxidation of the complexes as such, but is an activity occurring only in the presence of the living cells.

The chemical nature of our complexes makes it evident that they do not act as subtrates or foods; but this is further shown by the fact that stimulation of respiration is not obtained either with the simple salts of the same metals or with the hydroxy acids corresponding to the metal complexes.

It will also be noted that, as compared with the Sperti extractives mentioned above, many of our metal complexes are capable of producing a very much greater stimulation of respiration.

Aside from, or as incident to the stimulation of cellular respiration, we have demonstrated that our metal complexes produce the following effects:

1. Our metallic complexes increase the oxidation of ascorbic acid, which is the subtrate used in the Cytochrome Oxidase-Cytochrome C system of Schneider and Potter (see Schneider, W. C. and Potter, V. R., J. Biol. Chem. (1943), 149, 217). The iron bearing enzymes which have to do with the iron-oxidation system of the cell, and which are believed to be the Cytochromes A, B and C and Cytochrome Oxidase, are rendered more or less inactive by certain substances which depress cellular respiration. Without wishing to be bound by theory, we believe that the action of our complexes in stimulating respiration is that, in part at least, they tend to perform the action of these enzymes.

2. Catalase is a cellular enzyme having to do with the the decomposition of the waste product $H_2O_2$. Our compounds, as tested by the procedure of Euler and Josephson (see Euler, H. von and Josephson, K., Ann. Chem. (1927) 452, 158) show an increase in this activity, believed by us to be a direct acceleration of the enzyme, or possibly produced by keeping the enzyme in the oxidized state.

3. Peroxidase is a cellular enzyme having to do with the oxidation and elimination of phenolic waste products. We have found that our metal complexes stimulate this activity, again believing the action to be one of direct acceleration of the enzyme.

4. We have found that our metal complexes are effective in overcoming or offsetting toxicities of the type of poisons which attack the iron-oxidation system of the cell. Examples of such poisons are cyanides, sodium azide, and mercurials such as merphenyl nitrate. It will be noted that the class includes common antiseptics and germicides used and usable in topical remedies, detergents or cosmetics.

Phenols appear also to be affected, although the mechanism here may be in principal part the acceleration of peroxidase action.

5. Our metal complexes also stimulate the metabolism of animal cells.

We have pointed out above that, with an exception, neither simple inorganic metal salts, nor the acids corresponding to our metal complexes are effective for our purpose. Thus cis aconitic acid, citric acid and the like are inactive, as well as sulfates, chlorides and the like of the metals mentioned. The exception is the simple salts of iron. By way of example, ferric sulfate shows a certain amount of stimulation of respiration. We believe that this may be due to the formation of minor amounts of hydroxy acid complexes of iron in the cells by the interaction of cellular substances with ferric sulfate, and probably occurs most readily in cells, as it were, starved of iron.

This suggests the use, along with complexes of other metals, of simple salts of iron or iron complexes. In the practice of our invention we include the use of mixtures of our metallic complexes. We also include as set forth above mixtures of our metallic complexes with the cellular extractives of the Sperti patents.

Our metallic complexes find utility in various fields. In detergents and cosmetics they may be used to offset the respiratory depression produced by other ingredients, or to increase cellular respiration in spite of the presence of such other ingredients.

In topical remedies for skin irritations, lesions, burns and wounds, our metallic complexes may be employed for the same purposes. Additionally, they may be employed to promote healing and cellular proliferation.

In connection with the use of our complexes in the field of remedial agents, it may be noted that the effect of our complexes in stimulating cellular respiration and other functions is not the same for all kinds of cells. It has been shown, for example, that optimum conditions for the respiration of animal skin cells do not coincide with the optimum conditions for vegetable cells, and in particular that our complexes have a markedly less effect in promoting the respiration of bacteria than in promoting the respiration of animal cells, and in overcoming toxicities in the environment of animal cells. This fact makes it possible, in topical remedies containing germicides, to add our metal complexes to the extent of maintaining the respiration of animal skin cells and overcoming the toxicity of the germicides with respect to them, while maintaining the germicide at a level toxic to bacteria, the bacteria not being stimulated by the metal complexes sufficiently to overcome the toxic effect of the germicides.

The use of our metallic complexes is not confined to the balancing of respiratory depression in preparations otherwise having that effect. They may be employed for deliberate respiratory stimulation in vehicles which do not have the effect of retarding respiration and do not contain toxic substances.

In the Sperti Patents 2,320,478 and 2,320,479 examples of cosmetics, detergents and topical remedies are given as follows:

*Example I.—Vanishing cream*

| | Grams |
|---|---|
| Stearic acid | 180 |
| Caustic soda | 9 |
| Glycerine | 50 |
| Water (distilled) | 750 |
| Perfume | 11 |
| R. S. F | 10 |

Example II.—Cold cream

| | Grams |
|---|---|
| Liquid paraffin | 300 |
| Solf. white paraffin | 200 |
| White beeswax | 100 |
| Stearic acid | 14 |
| Triethanolamine | 6 |
| Borax | 10 |
| Water (distilled) | 300 |
| Perfume | 5 |
| R. S. F. | 10 |

Example III.—Soap

| | Grams |
|---|---|
| Soap stock | 920 |
| Sodium hydroxide | 120 |
| R. S. F. | 10 |
| Perfume | 10 |
| Water | 150 |

Example IV.—Emollient skin balm

| | | |
|---|---|---|
| Gum Karaya | g | 3.5 |
| Water (distilled) | cc | 108.6 |
| Glycerine | cc | 18.9 |
| 95% alcohol | cc | 76.1 |
| Salicyclic acid | g | 0.1944 |
| Carbolic acid | g | 0.3240 |
| Powdered soap | g | 3.0 |
| R. S. F. | g | 2.10 |
| Perfume. | | |

Example V.—Skin freshener

| | Grams |
|---|---|
| Alum | 40 |
| Borax | 30 |
| Glycerine | 30 |
| Alcohol | 200 |
| Orange flower water | 300 |
| Rose water | 400 |
| R. S. F. | 10 |

Example VI.—Salve containing growth-promoting factor in the form of fish liver oil concentrate

| | | |
|---|---|---|
| Growth factor | g | 210 |
| Merphenyl nitrate | g | 1.75 |
| Corn oil | g | 350 |
| Oil of thyme | cc | 7 |
| Petrolatum | g | 6410 |
| R. S. F. | g | 70 |

These examples of cosmetics, detergents and topical remedies are not intended to be limiting, but are merely illustrative of compositions with which our metal complexes may be used. It will be noted that all of them contain substances acting to depress cellular respiration, and some of them contain toxic substances.

The "R. S. F." noted in the above formulae is the Sperti cellular extractive already discussed, and having the property of stimulating cellular respiration. As illustrating the use of our metal complexes, they may be added to the exemplary compositions given above, or substituted in whole or in part for the "R. S. F." in these compositions. They may be used in a similar fashion in other compositions, as will be evident.

They will be dissolved in the water contained in the compositions, or added in the form of water solutions during the compounding of the compositions. They may be added in varying quantity depending upon the result desired, whether it be to stimulate cellular respiration above normal, to counterbalance the depression of respiration produced by other ingredients, in greater or less degree, or to maintain cellular activity at a normal level in spite of the presence of respiration-depressing ingredients.

The table above will serve as a guide to the percentage stimulation which may be expected with different quantities or concentrations of various ones of our metal complexes. It will be understood that the effect of different cosmetics, detergents and topical remedies in depressing respiration and other cellular activity will vary, depending upon their formulae, and to some extent upon their manner of use. To illustrate the effect of magnesium citrate, as an exemplary one of our metal complexes, in overcoming the respiration-depression produced by a commercial lotion (not containing R. S. F.) we present the following:

| Content of Flask | Control | 0.1 ml. Lotion | | 0.05 ml. Lotion | | 0.025 ml. Lotion | |
|---|---|---|---|---|---|---|---|
| | | No Mg. Citrate | Mg. Citrate | No Mg. Citrate | Mg. Citrate | No Mg. Citrate | No Mg. rate |
| In KOH | 0.2 ml | 0.2 | 0.2 | 0.2 | 0.2 | 0.2 | 0.2 |
| Ringer Phosphate Glucose | 3.0 ml | 2.9 | 1.9 | 2.95 | 1.95 | 2.975 | 1.975 |
| Mg. Citrate, 15 mgs./ml | 0.0 ml | 0.0 | 1.0 | 0.0 | 1.0 | 0.0 | 1.0 |
| Lotion, ml | 0.0 | 0.1 | 0.1 | 0.05 | 0.05 | 0.025 | 0.025 |
| Skin Tissue, Dry Wgt. in Mgs | 32.4 | 25.10 | 25.0 | 33.6 | 25.3 | 29.3 | 37.9 |

Skin tissue varied from 25–35 mgs. per flask. Results calculated per mg. dry tissue per flask.

RESULTS

| | Control | 0.1 ml. Lotion | | 0.05 ml. Lotion | | 0.025 ml. Lotion | |
|---|---|---|---|---|---|---|---|
| | | No Mg. Citrate | Mg. Citrate | No Mg. Citrate | Mg. Citrate | No Mg. Citrate | Mg. Citrate |
| Cu. mm. $O_2$ Reading at 2 hrs | 47.85 | 8.05 | 50.00 | 27.28 | 52.36 | 24.80 | 73.67 |
| Cu. mm. $O_2$ per mg. tissue per 2 hrs | 1.47 | 0.33 | 2.00 | 0.81 | 2.07 | 0.85 | 1.95 |

It will be apparent that the invention in the various aspects of use and embodiment is not restricted to any particular type or form of topical remedy, detergent, cosmetic or other preparation for application to skin, epithelial tissue, or parts of bodies where such substances may be brought into contact with animal cells, or as to the proportions and nature of ingredients other than our metal complexes which such preparations contain, as many variations thereof will now suggest themselves to those skilled in the art without departure from the spirit of the invention. Hence reference should be had to the appended claims for a definition of the limits of the invention.

Having described our invention in certain exemplary embodiments, what we claim as new and desire to secure by Letters Patent is:

1. In combination, a substance for treating living animal tissue, a proliferation stimulating agent capable of stimulating cellular proliferation of said tissue, and a stimulating agent for cellular respiration, said latter agent consisting of a water soluble metal complex comprising a metal radical chosen from a group consisting of calcium, magnesium, manganese, iron, zinc, lithium, potassium and copper, and an organic radical chosen from a group consisting of cis-aconitic acid, citric acid, and tartaric acid.

2. In combination, a substance for treating living animal tissue, a proliferation stimulating agent capable of stimulating cellular proliferation of said tissue, a germicide, and a stimulating agent for cellular respiration, said latter agent consisting of a water soluble metal complex comprising a metal radical chosen from a group consisting of calcium, magnesium, manganese, iron, zinc, lithium, potassium and copper, and an organic radical chosen from a group consisting of cis aconitic acid, citric acid, and tartaric acid, said respiration-stimulating agent being present in such amount as to enable animal cells to overcome the toxic effects of said germicide, said germicide being present in amounts lethal to bacteria.

3. A preparation for treating living animal cells, comprising a substance for treating said cells, a proliferation stimulating agent capable of stimulating cellular proliferation of said animal cells, and a germicide in quantities lethal to bacteria, said preparation containing a metal complex, comprising a metal radical of a group consisting of calcium, magnesium, manganese, iron, zinc, lithium, potassium, and copper and an organic radical chosen from a group consisting of cis-aconitic acid, citric acid, and tartaric acid in quantity such as to stimulate the respiration of animal cells.

4. A topical remedy of the type which causes depression of cellular respiration in the tissue to which it is applied, said remedy containing a proliferation stimulating agent capable of stimulating cellular proliferation of the tissue, and a respiratory stimulating agent capable of stimulating cellular respiration of said tissue as determined by manometric measurement, thereby compensating at least in part for said depressing effect, said respiratory stimulating agent consisting of a metal complex comprising a metal radical chosen from a group consisting of the following: calcium, magnesium, manganese, iron, zinc, lithium, potassium and copper, and an organic radical chosen from a group consisting of: cis aconitic acid, citric acid, and tartaric acid.

5. A topical remedy of the type which causes depression of cellular respiration in the tissue to which it is applied, said remedy containing a proliferation stimulating agent capable of stimulating cellular proliferation of said tissue, and a respiratory stimulating agent capable of stimulating cellular respiration of said tissue as determined by manometric measurement, thereby compensating at least in part for said depressing effect, said agent being a metal complex formed of a metal chosen from a class consisting of magnesium, calcium, potassium, iron, zinc, manganese, lithium and copper, and the radical of an organic hydroxy acid, chosen from a class consisting of citric acid, tartaric acid and cis-aconitic acid.

6. A detergent preparation comprising a detergent substance, a proliferation stimulating agent capable of stimulating cellular proliferation of the tissue, and an agent capable of stimulating cellular respiration of tissue to which the detergent substance is applied, said latter agent consisting of a metal complex comprising a metal radical chosen from a group consisting of the following: calcium, magnesium, manganese, iron, zinc, lithium, potassium, and copper, and an organic radical chosen from a group consisting of: cis aconitic acid, citric acid, and tartaric acid.

References Cited in the file of this patent

UNITED STATES PATENTS

| Number | Name | Date |
|---|---|---|
| 98,690 | Grigg | Jan. 11, 1870 |
| 295,078 | Thatcher | Mar. 11, 1884 |
| 345,867 | Sonstadt | July 20, 1886 |
| 991,261 | Ritter | May 2, 1911 |
| 1,455,485 | Grove | May 15, 1923 |
| 1,484,415 | Shepherd | Feb. 19, 1924 |
| 1,619,076 | Kuever | Mar. 1, 1927 |
| 1,845,486 | Crossley | Feb. 16, 1932 |
| 2,320,478 | Sperti | June 1, 1943 |
| 2,320,479 | Sperti | June 1, 1943 |

FOREIGN PATENTS

| Number | Country | Date |
|---|---|---|
| 10,460 | Great Britain | of 1911 |

OTHER REFERENCES

J. A. M. A., Oct. 23, 1943, p. 476.

Papoff, Chem. Abst., vol. 18, p. 993, 1924.

New and Nonofficial Remedies, 1944—Amer. Medical Assn., p. 392, 393, 394.

Seifensieder Zeitung, vol. 68 (1941), p. 142.